March 5, 1929.   F. H. KAMPMAN   1,704,505

AUTOMOBILE ACCELERATOR REGULATING DEVICE

Filed May 2, 1928   2 Sheets-Sheet 1

INVENTOR.
Frederick H Kampman
BY
Myron J Dikeman
ATTORNEY.

March 5, 1929.  F. H. KAMPMAN  1,704,505
AUTOMOBILE ACCELERATOR REGULATING DEVICE
Filed May 2, 1928  2 Sheets-Sheet 2
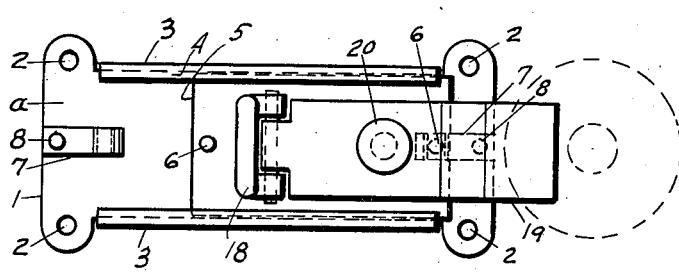
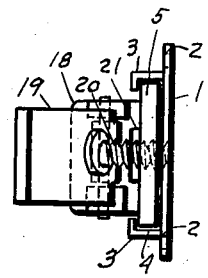
Fig. 5  Fig. 7
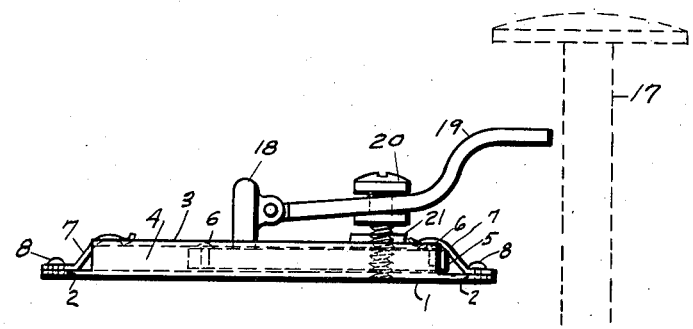
Fig. 6
INVENTOR.
Frederick H Kampman
BY Myron J Dikeman
ATTORNEY.

Patented Mar. 5, 1929.

1,704,505

UNITED STATES PATENT OFFICE.

FREDERICK H. KAMPMAN, OF DETROIT, MICHIGAN.

AUTOMOBILE ACCELERATOR-REGULATING DEVICE.

Application filed May 2, 1928. Serial No. 274,538.

The object of my invention is to produce a regulating device adapted for controlling and regulating and limiting the movement of the accelerator pedal of an automobile, and prevent it from being moved beyond predetermined points.

Another object is to produce an accelerator regulating device that may be adjusted to engage an auto accelerator pedal for preventing same from being opened beyond a certain predetermined position, for preventing the automobile from being driven beyond some predetermined speed and which may be changed at will of the driver by readjustment of the device.

A further object of my device is to produce an automobile accelerator pedal regulator that will engage the pedal when the auto has reached a certain speed, and which may be easily disengaged by the driver if a greater speed is desired.

Owing to the present congested traffic conditions in the average large city it has become necessary to limit the speed of automobile travel within certain city limits, and which is usually regulated by law or city ordinances which specify a certain speed limit through city streets. My device is especially adapted for keeping and preventing an automobile from being driven at a greater speed if once properly adjusted to the car and the operating fuel mechanism.

In general my device comprises a rigid grooved frame having a slide member movably mounted therein, the frame being provided with means for fixedly attaching same to the floor of an automobile near the accelerator pedal. The movable slide is provided with an adjustable member for regulating the height of the engaging member which is designed and positioned thereon to engage the auto accelerator mechanism, when said slide is in one position within the grooved frame, or it may be disengaged from the accelerator pedal if moved to the opposite end of the frame groove. The slide is provided with means for conveniently moving same to any desired position within the frame, either for regulating or disengaging the pedal mechanism.

The several objects are attained by the construction and arrangement of parts more fully hereinafter set forth.

Similar parts on all drawings are marked by similar numerals.

Fig. 5 is a plan view of a modified form of my device, provided with a movable adjusting member, and with the slide operating mechanism omitted.

Fig. 6 is an edge view of the alternate form as shown in Fig. 5, showing the relative position of the adjustable member to the slide and frame, and means for operating the device.

Fig. 7 is an end view of the alternate device showing the general arrangement of the moving parts with means for holding the slide within the frame.

Figure 1:
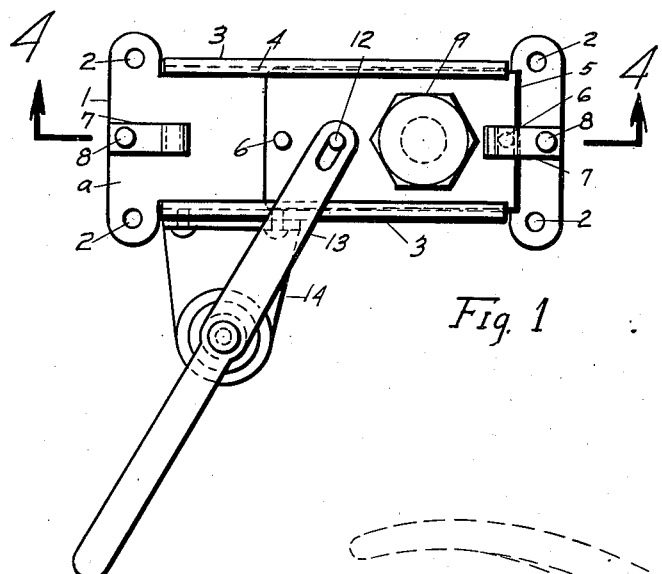
Fig. 1 shows a plan view of my device showing the general arrangement of the operating parts.
Figure 3:
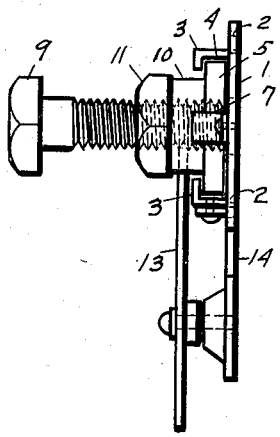
Fig. 3 is an end view of the device showing the movable slide and grooves for retaining same within the frame, together with its operating mechanism.
Figure 2:
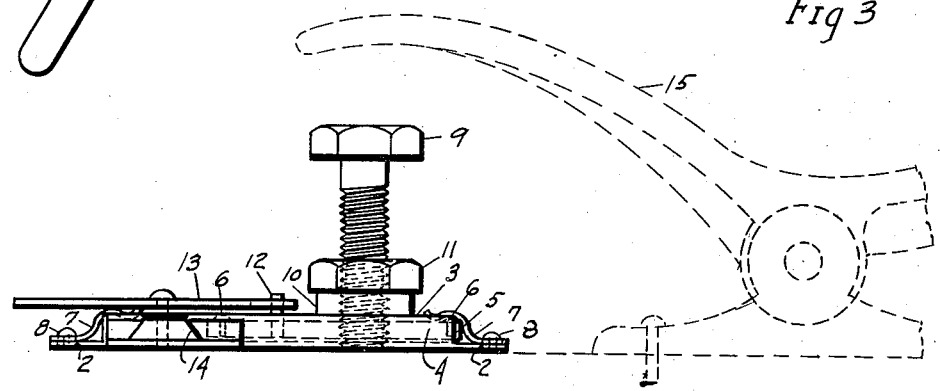
Fig. 2 is an edge view of the device showing the adjustable stop member and its application to an automobile accelerator pedal.

I will now describe more fully the detailed construction of my device, referring to the drawings and the marks thereon.

The frame —1— is made of metal, preferably of thin sheet steel or aluminum, and may be formed of a simple stamping suitable for press and die manufacturing. The frame —1— comprises a flat base section —a— having projecting flanges formed at each corner thereof and each flange being provided with a screw hole —2— therethrough for securely attaching the frame to the auto floor board. The sheet metal frame is folded along opposite edges providing parallel slide sides —3—, forming a rectangular grooved recess —4— the entire length of the frame. Within the said rectangular grooved recess —4— is placed an adjustable slide —5—. The slide —5— is preferably made of a rectangular block of metal which fits the grooved recess —4— but is free to slide therein to any position within the frame, and from one end thereof to the other. At each end of the slide —5— is formed a raised stop —6— which may be formed of a rivet head mounted thereon as shown in the drawings, Fig. 1, or any other suitable raised projection formed on the slide block itself. At each end of the frame —1— is mounted a stop spring —7— securely attached to the frame base —a— by the rivets —8—, said stops being positioned thereon for engaging the stops —6— of the slide, and for holding said slide in position at either end of the grooved recess —4—. Near one end of the slide —5— is mounted an adustable stop bolt —9—, preferably formed of a standard machine bolt of a size and length as may be required to fit the particular make auto to which the device is applied. The adjustable stop bolt —9— is threaded and screwed into the slide boss —10— and positioned thereon at right angles to the axis of the slide block —5—, and is provided with a special lock nut —11— for securely locking the adjusting stop bolt in any desired position, and at some predetermined height. At the opposite end of the slide —5—, on the top side thereof, is mounted an operating pin —12—, also projecting from the top of the slide at right angles thereto, and carries mounted thereon an operating lever —13—. The lever —13— is pivotally mounted on a bearing —14— which is fixedly mounted in at the side of the frame —1—, and so arranged that any movement of the lever —13— on its pivot bearing will move the connected slide —5— from one end of the grooved frame to the other, thus moving the stop bolt —9— within or without the range of the automobile accelerator pedal —15—, and limits the stroke the pedal may be moved or allow the full operation thereof. The height of the stop bolt —9— may be changed and varied to meet the requirements of the various make automobiles on which it may be used, and also depends upon the desired speed the automobile is to be operated, When the device is not desired the slide —5— is easily displaced by the driver simply by moving the operating lever —13— with his foot.

Figure 4:
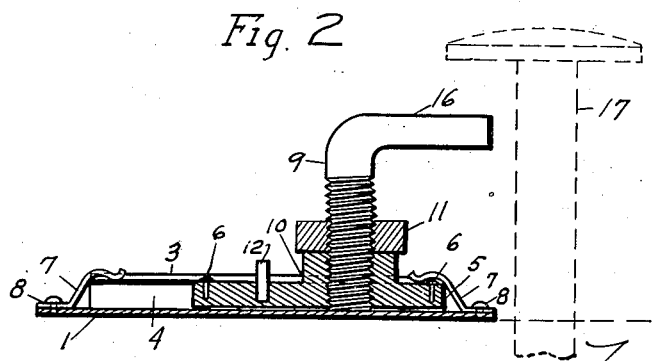
Fig. 4 is a sectional view taken along the line 4—4 of Fig. 1 showing the general construction and relative position of the slide, but is provided with a modified form of adjustable stop.

A modified form of stop bolt is shown in Fig. 4 and which is provided with an extended engaging arm —16— for engaging the auto accelerator mechanism, and is especially adapted for use with pin type of accelerator —17— as is illustrated in Fig. 4. Its purpose and operation are the same as heretofore described.

An alternate form of my device is shown in Figs. 5, 6 and 7 of the drawings, but which utilizes a similar grooved recess frame —1— as in the former case, together with a similar slide member —5—. The operating lever mechanism —13— is omitted, and the slide —5— is provided with a projecting ridge —18— suitable for being easily engaged by the driver's foot for moving said slide backward and forward within the frame groove —4—. Also the adjusting bolt —9— is replaced with an adjusting bar —19— which is hinged to the projecting ridge —18, and is projected over the end of the frame. The adjusting bar —19— is provided with an adjusting screw —20— mounted within the threaded slide boss —21—, for varying the position of the adjusting bar —19— as conditions may require. The operation is the same as heretofore described.

Having fully described my automobile accelerator regulating device, what I claim as my invention and desire to secure by Letters Patent is:

1. A regulating device adapted for regulating the movement of an automobile accelerator pedal, comprising a rigid frame member having means for fixedly attaching same to a floor board near the auto accelerator pedal, a movable member slidably mounted therein, an adjustable stop member mounted on the top and near one end of said movable member, an operating lever attached to said movable member and so pivoted thereto as to change the position of said movable member within the frame when said lever is moved.

2. A regulating device adapted for regulating and limiting the movement of an automobile accelerator pedal, comprising a slotted recessed frame having means for fixedly attaching same to the floor board of an auto near the accelerator pedal, a slide mounted within said slotted recess capable of being moved to any position along said recess, a threaded stop member adjustably mounted on the top of said slide near one end thereof capable of being adjusted to various heights thereon, an operating lever pivotally mounted on said frame and attached to said slide so as to cause movement thereof within the frame recess slot for moving said slide from one end of said frame to the other.

3. A regulating device adapted for regulating and limiting the movements of an automobile accelerator pedal, comprising a rigid slotted frame member having means for fixedly attaching same to the floor board of an auto near the accelerator pedal, a slide movably mounted within said slotted frame capable of being moved from one end of the frame to the other end, an adjustable stop member mounted on the top of said slide near one end thereof, means formed on said adjustable member for changing and regulating its height above the supporting slide, means mounted on the opposite end of said slide for engaging same and moving the slide from one end of the frame to the other, and means mounted on said frame for retaining the said slide in its end positions within said frame.

4. A regulating device adapted for limiting the movement of an automobile accelerator pedal, comprising a rigid frame having a slotted recess formed the entire length thereof, means formed in said frame for fixedly attaching same to the floor board of an auto near the accelerator pedal, a slide member movably mounted within said frame recess slot, a threaded adjustable stop bolt mounted on the top of said slide near one end thereof and having means for adjusting the height of said stop bolt, an operating lever pivotally mounted on said frame and so attached to the said slide as to cause movement thereof from one end of the frame slot to the other, and spring catches mounted at each end of said frame for engaging the slide and holding same at fixed positions at either end of the frame slot.

In witness whereof I sign these specifications.

FREDERICK H. KAMPMAN.